(12) United States Patent
Yamada

(10) Patent No.: US 12,159,073 B2
(45) Date of Patent: Dec. 3, 2024

(54) PROCESSING SYSTEM, INFORMATION PROCESSING APPARATUS, STORAGE MEDIUM, AND IMAGE FORMING APPARATUS

(71) Applicant: SEIKO EPSON CORPORATION, Tokyo (JP)

(72) Inventor: Takeshi Yamada, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/063,700

(22) Filed: Dec. 9, 2022

(65) Prior Publication Data

US 2023/0185498 A1 Jun. 15, 2023

(30) Foreign Application Priority Data

Dec. 9, 2021 (JP) .................................. 2021-199903

(51) Int. Cl.
G06F 3/12 (2006.01)
G06F 21/32 (2013.01)
G06F 21/34 (2013.01)

(52) U.S. Cl.
CPC .......... *G06F 3/1238* (2013.01); *G06F 3/1222* (2013.01); *G06F 3/1267* (2013.01); *G06F 21/32* (2013.01); *G06F 21/34* (2013.01)

(58) Field of Classification Search
CPC .... G06F 3/1238; G06F 3/1222; G06F 3/1267; G06F 21/32; G06F 21/34; G06F 21/31; G06F 21/608
See application file for complete search history.

(56) References Cited

U.S. PATENT DOCUMENTS

| 10,809,952 | B1 * | 10/2020 | de Beus | G06F 3/1204 |
| 11,523,012 | B1 * | 12/2022 | Pinney | H04N 1/442 |
| 2010/0002250 | A1 * | 1/2010 | Sakagami | H04L 63/0853 358/1.14 |

(Continued)

FOREIGN PATENT DOCUMENTS

| CN | 109101201 A | * 12/2018 | ........... G06F 3/1222 |
| JP | 2019014191 A | 1/2019 | |
| JP | 2020204853 A | * 12/2020 | |

*Primary Examiner* — Ted W Barnes
(74) *Attorney, Agent, or Firm* — CHIP LAW GROUP

(57) ABSTRACT

A processing system includes a first authentication section that performs first authentication based on first authentication information associated with a user when acquiring the first authentication information, and a processor that acquires authentication success information indicating that second authentication was performed based on second authentication information different from the first authentication information and acquired by detecting the user in a contactless manner, and that stores a print job associated with the user. The processor displays, when the first authentication is performed while the print job associated with the user is stored, a print instruction screen accepting an instruction for executing printing based on the print job on the display, and causes, when the authentication success information is acquired while the print job associated with the user is stored, the image forming apparatus to execute the printing based on the print job without displaying the print instruction screen on the display.

12 Claims, 12 Drawing Sheets

(56) References Cited

U.S. PATENT DOCUMENTS

| | | | |
|---|---|---|---|
| 2010/0220349 A1* | 9/2010 | Ogura | G06F 3/1222 |
| | | | 358/1.14 |
| 2011/0304872 A1* | 12/2011 | Odagiri | H04N 1/4413 |
| | | | 358/1.13 |
| 2013/0278966 A1* | 10/2013 | Saito | G03G 15/502 |
| | | | 358/1.15 |
| 2014/0070002 A1* | 3/2014 | Pineau | G06F 21/608 |
| | | | 235/382 |
| 2016/0100074 A1* | 4/2016 | Nishii | G06F 21/32 |
| | | | 358/1.14 |
| 2017/0155800 A1* | 6/2017 | Nagasawa | H04N 1/00307 |
| 2018/0075032 A1* | 3/2018 | Kimura | G06F 1/3287 |
| 2018/0157448 A1* | 6/2018 | Takaoka | H04N 1/4426 |
| 2019/0012118 A1 | 1/2019 | Nakajima | |
| 2019/0129661 A1* | 5/2019 | Hirota | G06F 3/1238 |
| 2019/0129662 A1* | 5/2019 | Oguma | G06F 3/1238 |
| 2020/0218814 A1* | 7/2020 | Rothenbuhler | G06F 3/1285 |
| 2020/0293670 A1* | 9/2020 | Haapanen | G06F 21/35 |
| 2021/0029113 A1* | 1/2021 | Tomita | H04L 63/0861 |
| 2022/0083292 A1* | 3/2022 | Yamagishi | G06F 3/1222 |
| 2022/0244896 A1* | 8/2022 | Kakutani | H04L 41/0806 |
| 2022/0317958 A1* | 10/2022 | Shiohara | G06F 3/1262 |
| 2022/0350555 A1* | 11/2022 | Okada | H04N 1/00832 |
| 2023/0067414 A1* | 3/2023 | Arifuku | G06F 3/1203 |
| 2023/0119508 A1* | 4/2023 | Tomioka | G06F 3/1204 |
| | | | 358/1.14 |
| 2023/0155836 A1* | 5/2023 | Burnett | H04L 9/3268 |
| | | | 726/19 |

* cited by examiner

PROCESSING SYSTEM, INFORMATION PROCESSING APPARATUS, STORAGE MEDIUM, AND IMAGE FORMING APPARATUS

The present application is based on, and claims priority from JP Application Serial Number 2021-199903, filed Dec. 9, 2021, the disclosure of which is hereby incorporated by reference herein in its entirety.

BACKGROUND

1. Technical Field

The present disclosure relates to a processing system including an image forming apparatus that includes a display and that is capable of performing printing, an information processing apparatus, a non-transitory computer-readable storage medium, and the image forming apparatus.

2. Related Art

Before an image forming apparatus, such as a multifunction peripheral, performs printing based on a print job, a server or the image forming apparatus authenticates a user by accepting an operation, such as an operation of bringing an ID card close to the server or the image forming apparatus or an operation of inputting a user name and a password. Here, "ID" is an abbreviation of "identification". An image forming apparatus disclosed in JP-A-2019-14191 performs user authentication before displaying a list of registered print jobs on a display unit including a touch panel of the image forming apparatus and executing a print job corresponding to a print instruction issued in response to a touch operation performed by a user on the touch panel or the like.

When the technique described above is employed, it is highly likely that the user touches a device when requesting a user authentication, and furthermore, the user is required to touch the image forming apparatus when instructing execution of a print job.

SUMMARY

According to an aspect of the present disclosure, a processing system having an image forming apparatus that has a display and that is configured to perform printing includes a first authentication section that performs first authentication based on first authentication information associated with a user when acquiring the first authentication information, and a processor that is configured to acquire authentication success information indicating that second authentication was performed based on second authentication information that is different from the first authentication information and that is acquired by detecting the user in a contactless manner, and that stores a print job associated with the user. The processor displays, when the first authentication is performed while the print job associated with the user is stored, a print instruction screen for accepting an instruction for executing printing based on the print job on the display, and causes, when the authentication success information is acquired while the print job associated with the user is stored, the image forming apparatus to execute the printing based on the print job without displaying the print instruction screen on the display.

According to another aspect of the present disclosure, an information processing apparatus connected to an image forming apparatus that includes a display and that is configured to perform printing includes a first authentication section that performs first authentication based on first authentication information associated with a user when acquiring the first authentication information, and a processor that is configured to acquire authentication success information indicating that second authentication was performed based on second authentication information that is different from the first authentication information and that is acquired by detecting the user in a contactless manner, and that stores a print job associated with the user. The processor transmits, when the first authentication is performed while the print job associated with the user is stored, information for displaying a print instruction screen for accepting an instruction for executing printing based on the print job on the display, and causes, when the authentication success information is acquired while the print job associated with the user is stored, the image forming apparatus to execute the printing based on the print job without displaying the print instruction screen on the display.

According to a further aspect of the present disclosure, a non-transitory computer-readable storage medium storing a control program that controls an image forming apparatus that includes a display and that is configured to perform printing causes a computer to realize a first authentication function of performing first authentication based on first authentication information associated with a user when acquiring the first authentication information, and a processing function of acquiring authentication success information indicating that second authentication was performed based on second authentication information that is different from the first authentication information and that is acquired by detecting the user in a contactless manner, and storing a print job associated with the user. The processing function displays, when the first authentication is performed while the print job associated with the user is stored, a print instruction screen for accepting an instruction for executing printing based on the print job on the display, and causes, when the authentication success information is acquired while the print job associated with the user is stored, the image forming apparatus to execute the printing based on the print job without displaying the print instruction screen on the display.

An image forming apparatus includes a display, a printer, a first authentication section that performs first authentication based on first authentication information associated with a user when acquiring the first authentication information, and a processor that acquires authentication success information indicating that second authentication was performed based on second authentication information that is different from the first authentication information and that is acquired by detecting the user in a contactless manner, and that stores a print job associated with the user. The processor displays, when the first authentication is performed while the print job associated with the user is stored, a print instruction screen for accepting an instruction for executing printing based on the print job on the display, and causes, when the authentication success information is acquired while the print job associated with the user is stored, the printer to execute the printing based on the print job without displaying the print instruction screen on the display.

DESCRIPTION OF EXEMPLARY EMBODIMENTS

Figure 1:
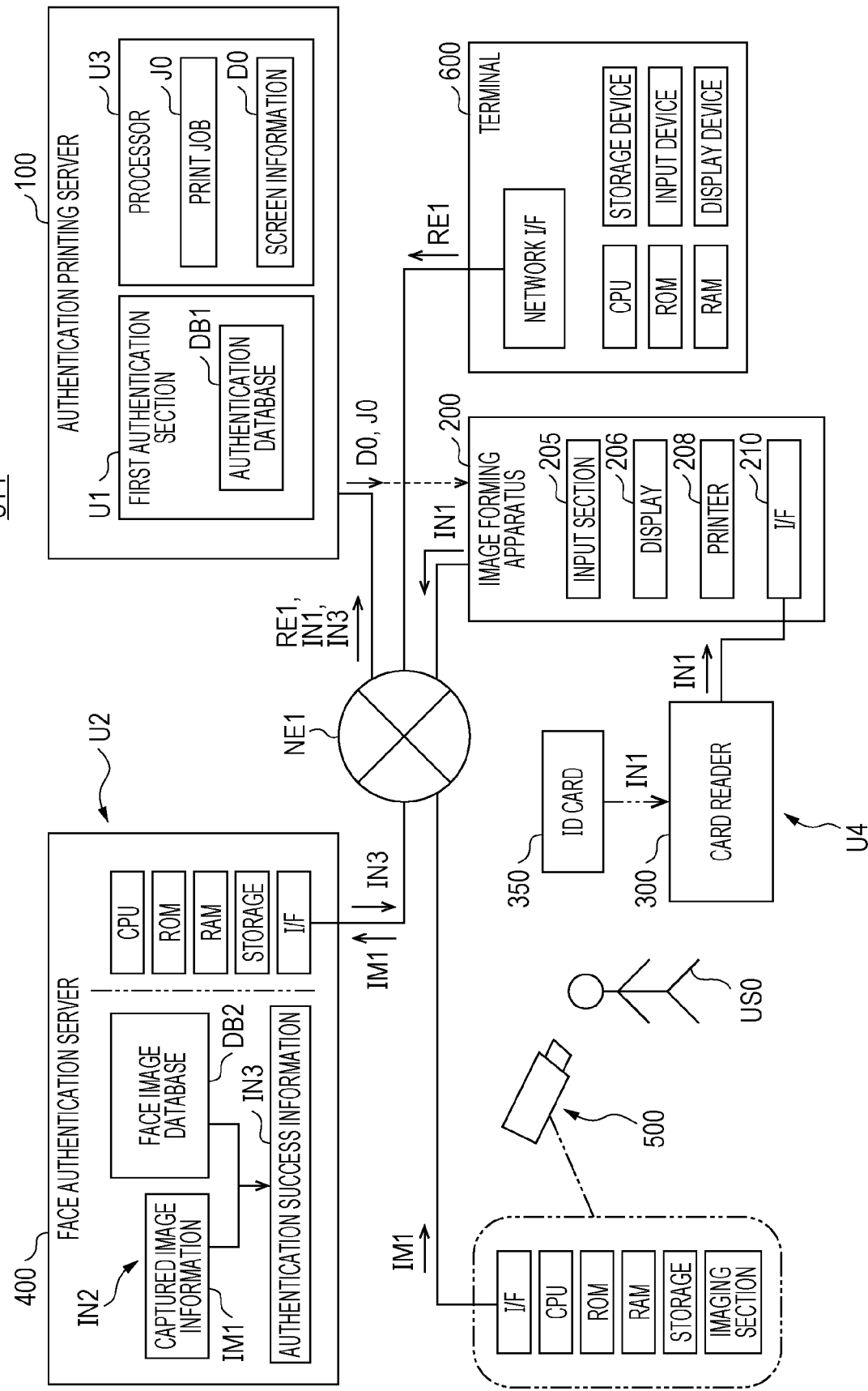
FIG. 1 is a block diagram schematically illustrating an example of a configuration of a system including a processing system.

Hereinafter, an embodiment of the present disclosure will be described. The embodiment below is merely an example of the present disclosure, and it is not necessarily the case that all features of this embodiment are requirements for the solving means of the present disclosure.

1. Outline of Technique of Present Disclosure

First, an outline of a technique included in the present disclosure will be described with reference to examples illustrated in FIGS. 1 to 14. Note that the drawings in this application schematically illustrates examples, and therefore, magnification factors in individual directions in the drawings may vary and the drawings may not be consistent. Components of this technique are obviously not limited to concrete examples denoted by reference numerals. In "Outline of Technique of Present Disclosure", text in brackets means supplemental description of a preceding word.

First Mode

Figure 13:
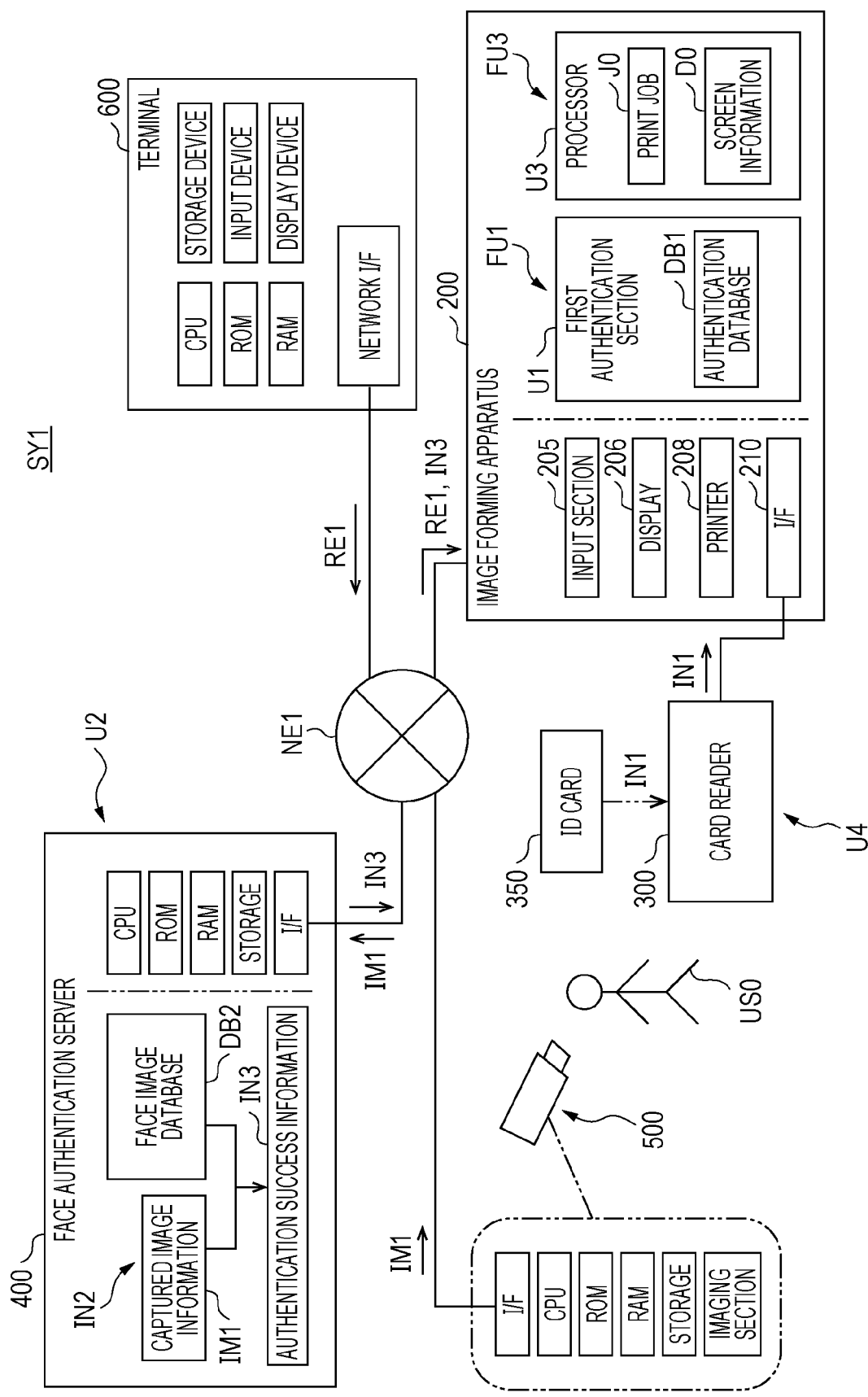
FIG. 13 is a block diagram schematically illustrating another example of the configuration of the system including the processing system.

As illustrated in FIGS. 1 and 13, a processing system SY1 according to a first mode of the present technique includes an image forming apparatus 200 that has a display 206 and that is capable of performing printing, and further includes a first authentication section U1 and a processor U3. The first authentication section U1 performs first authentication, when acquiring first authentication information IN1 associated with a user US0, based on the first authentication information IN1. The processor U3 is capable of acquiring authentication success information IN3 indicating that second authentication has been performed based on second authentication information IN2 that is different from the first authentication information IN1 and that is acquired by detecting the user US0 in a contactless manner and includes a print job J0 associated with the user US0. When the first authentication is performed while the first processor U3 stores the print job J0 associated with the user US0, the processor U3 displays a print instruction screen D2 for accepting an instruction for executing printing based on the print job J0 on the display 206. When acquiring the authentication success information IN3 while storing the print job J0 associated with the user US0, the processor U3 causes the image forming apparatus 200 to execute the printing based on the print job J0 without displaying the print instruction screen D2 on the display 206.

When the first authentication is performed while the first processor U3 stores the print job J0 associated with the user US0, the print instruction screen D2 for accepting an instruction for executing printing based on the print job J0 is displayed on the display 206. In this case, the user US0 may instruct execution of printing based on the print job J0 on the print instruction screen D2.

When the second authentication is performed while the print job J0 associated with the user US0 is stored by the processor U3, the processor U3 acquires authentication success information IN3. Then the print instruction screen D2 is not displayed on the display 206, and the image forming apparatus 200 executes printing based on the print job J0. In this case, the user US0 is not required to touch the apparatus when authentication of the user US0 is requested, or not required to touch the image forming apparatus 200 when using the image forming apparatus 200 to perform printing based on the print job J0.

As described above, the first mode provides the processing system SY1 capable of performing the process from the authentication to the printing in a contactless manner where appropriate.

Here, examples of the second authentication include face authentication based on a captured image IM1 of a face of the user UP0 and iris verification based on a captured image of an iris of the user US0. Accordingly, the second authentication information IN2 includes the captured image IM1 of the face or the captured image of the iris.

Examples of the first authentication that is different from the second authentication include authentication using an ID card 350, authentication performed by an operation of inputting a user name and a password, and biometric authentication, such as fingerprint authentication, and may further include authentication based on information acquired by detection of the user US0 in a contactless manner. The processing system SY1 may include a second authentication section U2 performing the second authentication.

The terms "first", "second", and so on in this specification are used to identify components having similarity and do not indicate order.

Note that the description above is also applied to modes below.

Second Mode

Figure 4:
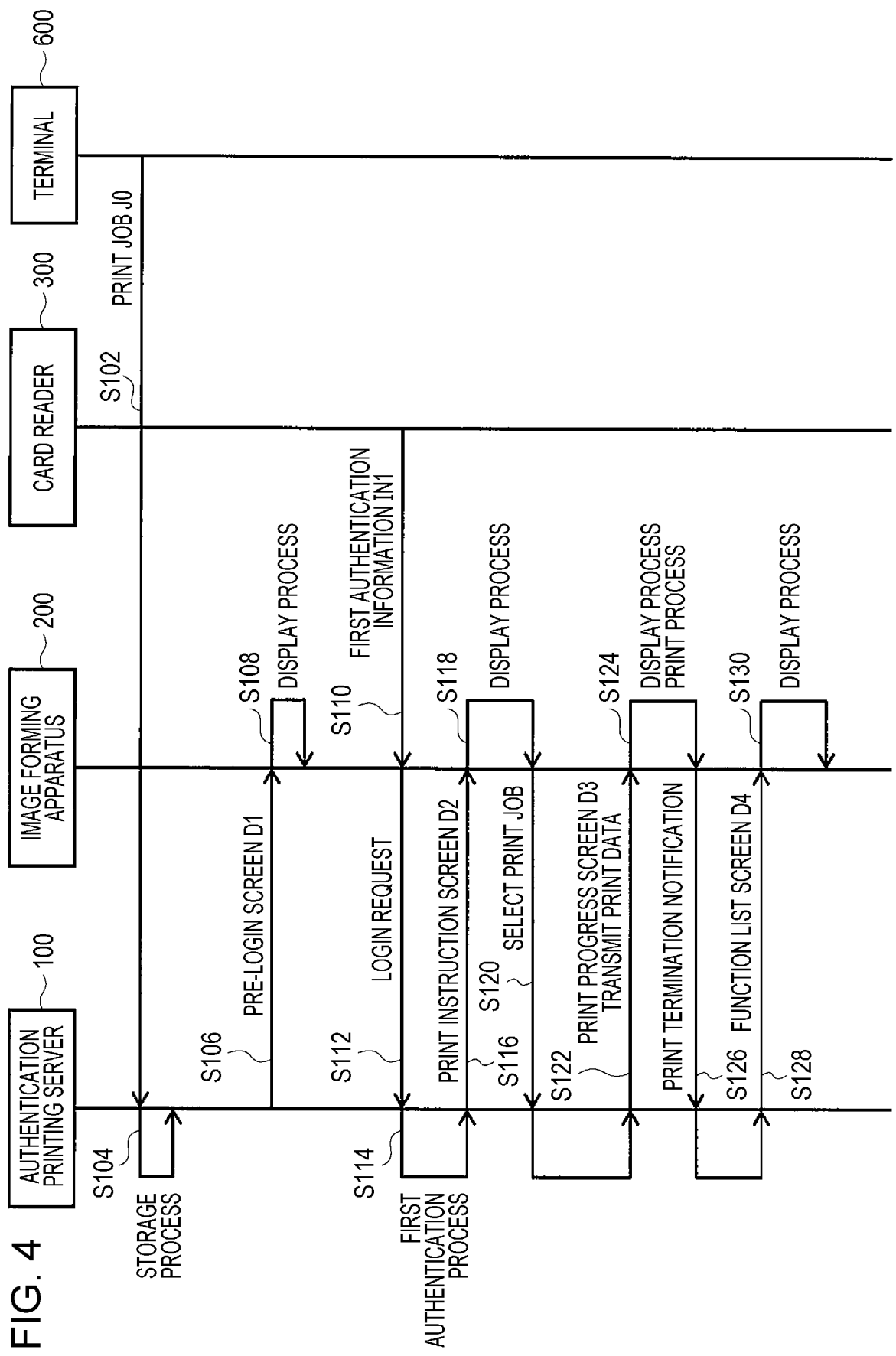
FIG. 4 is a diagram schematically illustrating an example of a flow of a process performed by the processing system when first authentication is performed.

As illustrated in FIG. 4 and so on, the first authentication section U1 may acquire the first authentication information IN1 from a receiver U4 that accepts an accessing operation of the user US0.

In the case described above, an instruction for executing printing is accepted when the first authentication is performed using the accessing operation as a trigger, and printing is executed without issuing an execution instruction when the second authentication is performed in a contactless manner. Accordingly, the second mode may provide the processing system SY1 of high usability.

Here, the accessing operation indicates an operation of bringing an object or a human body close to a device. Examples of the accessing operation include a touch operation of causing an object or a human body to touch a device and an operation of locating an object or a human body within a short distance, in which information may be acquired, from a device as a base point. For example, a card reader 300 that accepts an accessing operation of an ID card 350 may accept, in addition to a touch operation of the ID card 350, an operation of arranging the ID card 350 within a short distance, in which the first authentication information IN1 is readable, from the card reader 300 as a base point. Note that the description above is also applied to modes below.

Third Mode

As illustrated in FIGS. 1 and 13, the first authentication section U1 may acquire the first authentication information IN1 from a card (such as the ID card 350) that records the first authentication information IN1 in a readable manner. The second authentication information IN2 may be the captured image IM1 of the face of the user US0. The authentication success information IN3 may be generated when the second authentication section U2 performs the face authentication based on the captured image IM1 as the second authentication. The processor U3 may acquire the authentication success information IN3 from the second authentication section U2.

The third mode may provide a preferred example of the processing system SY1.

Fourth Mode

Figure 9:
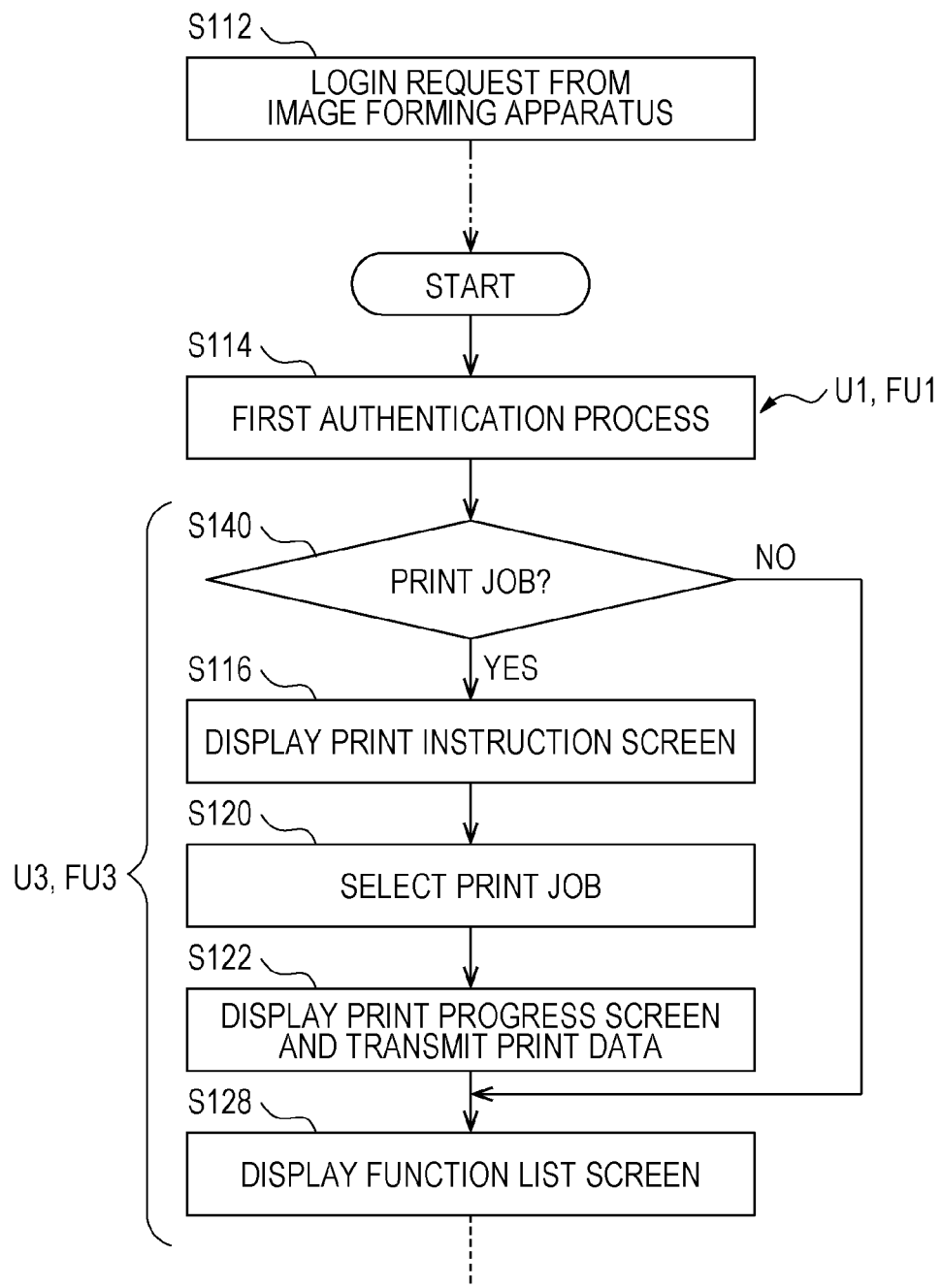
FIG. 9 is a flowchart schematically illustrating an example of a process performed by a first authentication section and a processor when the first authentication is performed.

As illustrated in FIG. 9, when the first authentication is performed while the first processor U3 stores the print jobs J0 associated with the user US0, the processor U3 may display the print instruction screen D2 including a list L1 of the print jobs J0 on the display 206. The processor U3 may accept a selection of one of the print jobs J0 in the list L1 or cause the image forming apparatus 200 to perform printing based on the selected print job J0.

According to the fourth mode, a print job J0 to be printed may be selected from the stored list L1 of the print jobs J0, and therefore, usability may be improved.

Fifth Mode

Figure 11:
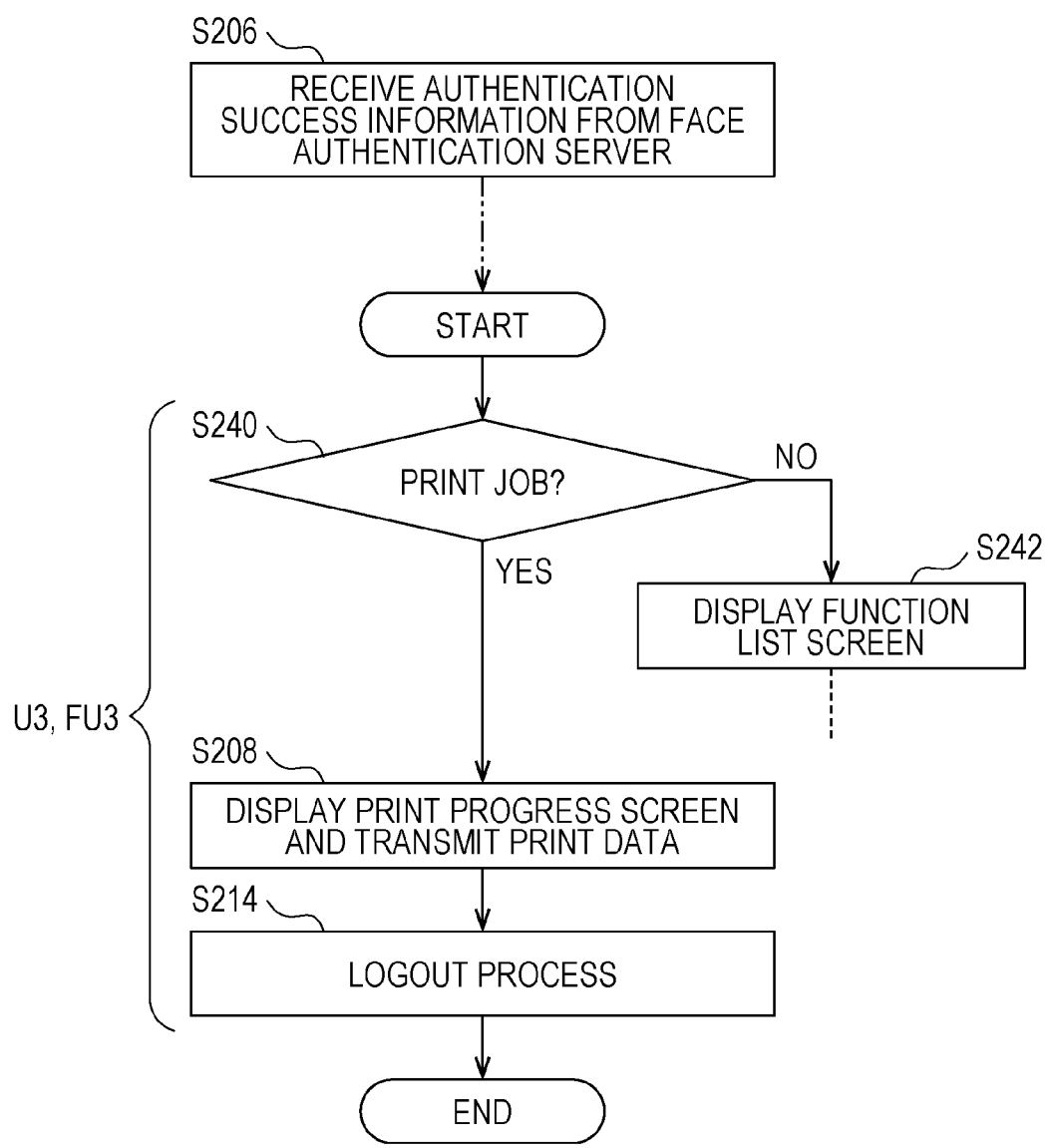
FIG. 11 is a flowchart schematically illustrating an example of a process performed by a processor when the second authentication is performed.
Figure 14:
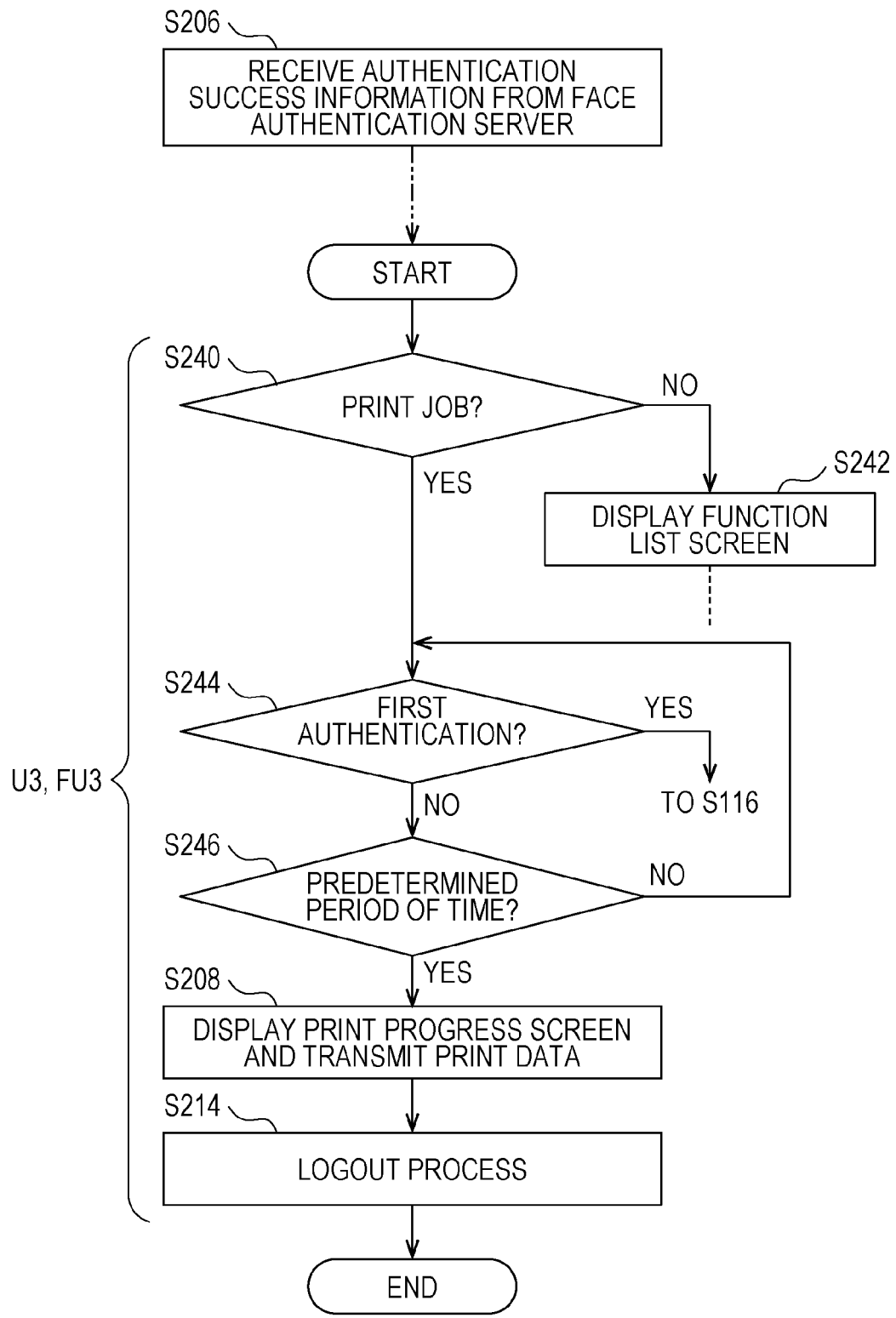
FIG. 14 is a flowchart schematically illustrating another example of the process performed by the processor when the second authentication is performed.

As illustrated in FIGS. 9, 11, and 14, when the first authentication is performed or the authentication success information IN3 is acquired while the processor U3 does not store any print job J0 associated with the user US0, the processor U3 may display a function list screen D4 of the image forming apparatus 200 on the display 206.

According to the fifth mode, an appropriate guide screen may be displayed when the number of print jobs J0 that are associated with the user US0 is 0.

Sixth Mode

As illustrated in FIG. 14, when the first authentication is performed for the user US0 within a predetermined period of time after the authentication success information IN3 corresponding to the user US0 is acquired, the processor U3 may not cause the image forming apparatus 200 to execute printing but may display the print instruction screen D2 on the display 206.

According to the sixth mode, an instruction for executing printing may be issued by operating the print instruction screen D2 within the predetermined period of time after the second authentication is performed, and therefore, usability may be improved.

Seventh Mode

As illustrated in FIG. 13, the processor U3 may be included in the image forming apparatus 200.

The seventh mode may provide the processing system SY1 that does not require a server that manages the image forming apparatus 200.

Eighth Mode

Figure 2:
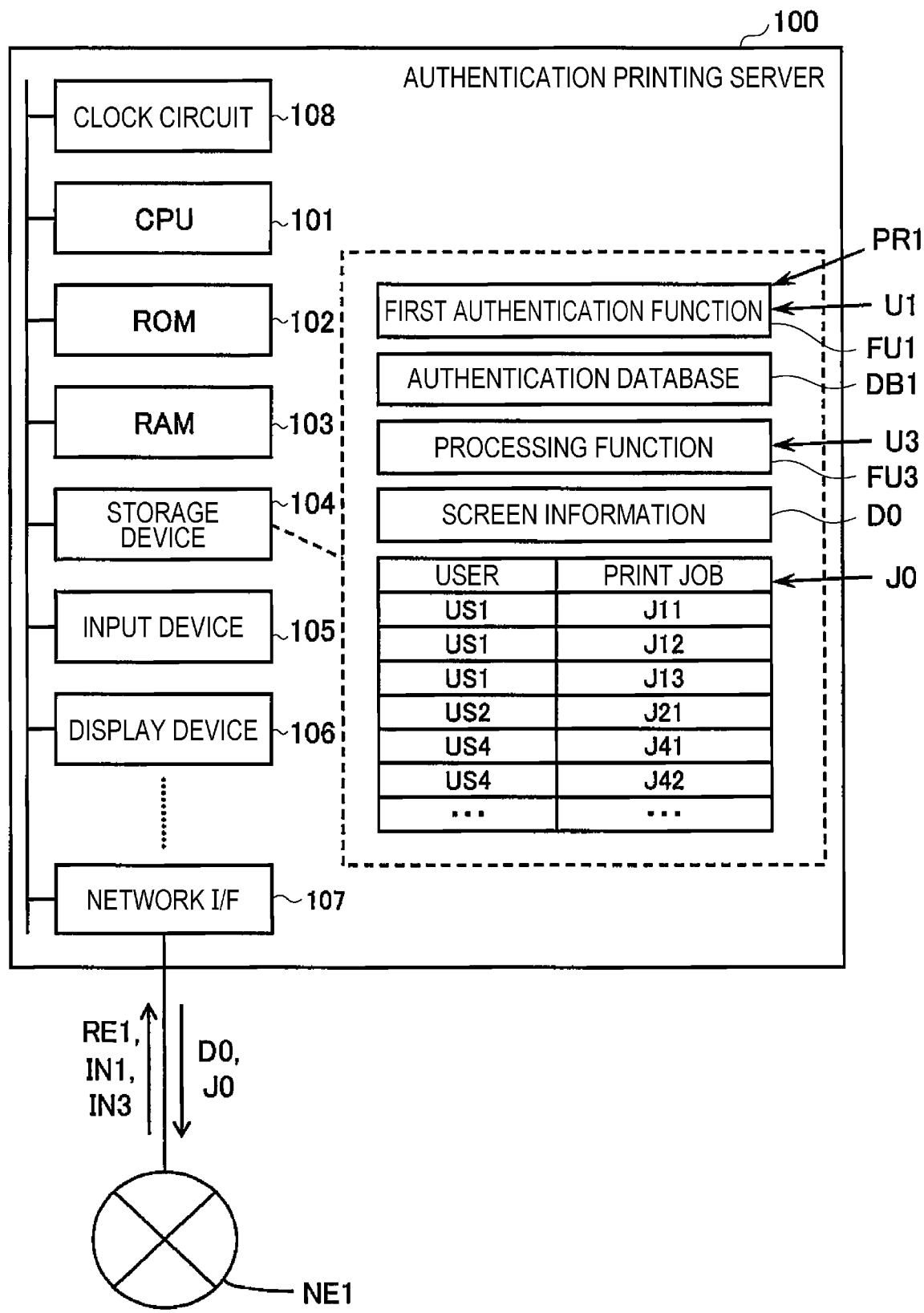
FIG. 2 is a block diagram schematically illustrating an example of a configuration of an information processing apparatus.

As illustrated in FIG. 1, the processor U3 and the image forming apparatus 200 may be connected to each other through a network NE1. As illustrated in FIG. 2, the processor U3 may include a transmitter (a network I/F 107, for example) that transmits screen information DO to be displayed on the display 206 to the image forming apparatus 200 through the network NE1. Here, "I/F" is an abbreviation of "interface".

The eighth mode may provide a preferred example of the processing system SY1 since the processor U3 connected through the network NE1 to the image forming apparatus 200 may perform advanced processing.

Ninth Mode

As illustrated in FIGS. 1 and 2, the information processing apparatus (the authentication printing server 100, for example) according to a mode of the present technique is connected to the image forming apparatus 200 that includes the display 206 and that is capable of performing printing, and includes the first authentication section U1 and the processor U3. The first authentication section U1 performs the first authentication based on the first authentication information IN1 when receiving the first authentication information IN1 associated with the user US0. The processor U3 is capable of acquiring the authentication success information IN3 indicating that the second authentication has been performed based on the second authentication information IN2 that is different from the first authentication information IN1 and that is acquired by detecting the user US0 in a contactless manner and has a print job J0 associated with the user US0. When the first authentication is performed while the processor U3 stores the print job J0 associated with the user US0, the processor U3 transmits information for displaying the print instruction screen D2 that accepts an instruction for executing printing based on the print job J0 on the display 206 to the image forming apparatus 200. When acquiring the authentication success information IN3 while storing the print job J0 associated with the user US0, the processor U3 causes the image forming apparatus 200 to execute the printing based on the print job J0 without displaying the print instruction screen D2 on the display 206.

The ninth mode provides the information processing apparatus (100) that enables the process from the authentication to the printing in a contactless manner where appropriate.

Tenth Mode

Furthermore, as illustrated in FIGS. 2 and 13, a control program PR1 according to a mode of the present technique controls the image forming apparatus 200 that includes the display 206 and that is capable of performing printing and causes a computer to realize a first authentication function FU1 and a processing function FU3. The first authentication function FU1 performs first authentication, when receiving the first authentication information IN1 associated with the user US0, based on the first authentication information IN1.

The processing function FU3 is capable of acquiring the authentication success information IN3 indicating that the second authentication has been performed based on the second authentication information IN2 that is different from the first authentication information IN1 and that is acquired by detecting the user US0 in a contactless manner and stores the print job J0 associated with the user US0. When the first authentication is performed while the first processing function FU3 stores the print job J0 associated with the user US0, the processing function FU3 displays the print instruction screen D2 for accepting an instruction for executing printing based on the print job J0 on the display 206. When acquiring the authentication success information IN3 while storing the print job J0 associated with the user US0, the processing function FU3 causes the image forming apparatus 200 to execute the printing based on the print job J0 without displaying the print instruction screen D2 on the display 206.

The tenth mode provides the control program PR1 that enables the process from the authentication to the printing in a contactless manner where appropriate.

Eleventh Mode

Furthermore, as illustrated in FIG. 13, the image forming apparatus 200 according to a mode of the present disclosure includes the display 206, a printer 208, the first authentication section U1, and the processor U3. The first authentication section U1 performs first authentication, when acquiring first authentication information IN1 associated with the user US0, based on the first authentication information IN1. The processor U3 is capable of acquiring authentication success information IN3 indicating that the second authentication has been performed based on the second authentication information IN2 that is different from the first authentication information IN1 and that is acquired by detecting the user US0 in a contactless manner and stores the print job J0 associated with the user US0. When the first authentication is performed while the first processor U3 stores the print job J0 associated with the user US0, the processor U3 displays a print instruction screen D2 for accepting an instruction for executing printing based on the print job J0 on the display 206. When acquiring the authentication success information IN3 while storing the print job J0 associated with the user US0, the processor U3 causes the printer 208 to execute the printing based on the print job J0 without displaying the print instruction screen D2 on the display 206.

The 11th mode provides the image forming apparatus 200 capable of performing the process from the authentication to the printing in a contactless manner where appropriate.

Furthermore, the present technique is applicable to a composite system including the processing system SY1, a composite apparatus including the information processing apparatus (100), an image forming system including the image forming apparatus 200, a processing method employed in the processing system SY1, an information processing method employed in the information processing apparatus (100), a processing method employed in the image forming apparatus 200, a method for controlling the image forming apparatus 200, a computer-readable medium recording the control program PR1, and the like. Any of the apparatuses described above may be constituted by a plurality of distributed portions.

2. Concrete Example of Configuration of Processing System

FIG. 1 is a diagram schematically illustrating a configuration of a system including the processing system SY1 as a concrete example. The system includes the authentication printing server 100, the image forming apparatus 200, the card reader 300, a face authentication server 400, an imaging apparatus 500, and a terminal 600. Here, the authentication printing server 100 is an example of the information processing apparatus, the card reader 300 is an example of the receiver U4, and the face authentication server 400 is an example of the second authentication section U2. The processing system SY1 includes the authentication printing server 100, the image forming apparatus 200, and the card reader 300. Note that the processing system SY1 may include the terminal 600, the face authentication server 400, or the imaging apparatus 500. The authentication printing server 100, the image forming apparatus 200, the face authentication server 400, the imaging apparatus 500, and the terminal 600 are connected to the network NE1 including the Internet. The network NE1 may include a LAN. "LAN" is an abbreviation of "local area network". Connection to the network NE1 may be realized by wired connection, wireless connection, or a combination of the wired connection and the wireless connection.

The user US0 uses the terminal 600 to register the print job J0 to the authentication printing server 100. Then the user US0 performs an accessing operation of bringing the ID card 350 in contact with or over the card reader 300 to successfully perform card authentication and causes the image forming apparatus 200 to execute printing based on the print job J0 registered in the authentication printing server 100. Here, the operation of bringing the ID card 350 over the card reader 300 includes, in addition to an operation of bringing the ID card 350 into contact with the card reader 300, an operation of arranging the ID card 350 within a short distance, in which the first authentication information IN1 is readable, from the card reader 300 as a base point. Furthermore, the user US0 may cause the image forming apparatus 200 to execute printing based on the print job J0 registered in the authentication printing server 100, when the imaging apparatus 500 successfully performs the face authentication by capturing a face image of the user US0.

Note that the number of combinations of the image forming apparatus 200, the card reader 300, and the imaging apparatus 500 in the processing system SY1 is not limited to 1, and may be 2 or more. Furthermore, the processing system SY1 may include two or more terminals 600.

The authentication printing server 100 is a server computer including the first authentication section U1 that performs the first authentication based on the first authentication information IN1 read from the ID card 350 and the processor U3 that causes the image forming apparatus 200 to perform printing based on the print job J0. The first authentication section U1 may acquire the first authentication information IN1 including information for identifying the user US0 from the ID card 350. The first authentication section U1 includes an authentication database DB1 that accumulates information for permitting authentication, and permits a login of the user US0 when the first authentication information IN1 received from the image forming apparatus 200 through the network NE1 has been registered in the authentication database DB1. The first authentication is thus performed. When receiving a print job registration request RE1 from the terminal 600 through the network NE1, the processor U3 generates a print job J0 in accordance with the print job registration request RE and associates the print job J0 with the user US0 before storing the print job J0. Furthermore, the processor U3 has screen information DO for displaying, on the display 206 of the image forming apparatus 200, screens, such as a pre-login screen D1 illustrated in FIG. 5, the print instruction screen D2 illustrated in FIG. 6, a print progress screen D3 illustrated in FIG. 7, and the function list screen D4 illustrated in FIG. 8. When the processor U3 performs authentication, such as card authentication or face authentication, and the authentication is successfully completed, the processor U3 may transmit the screen information DO suitable for a situation to the image forming apparatus 200 and transmit the print job J0 associated with the user US0 to the image forming apparatus 200.

Figure 3:
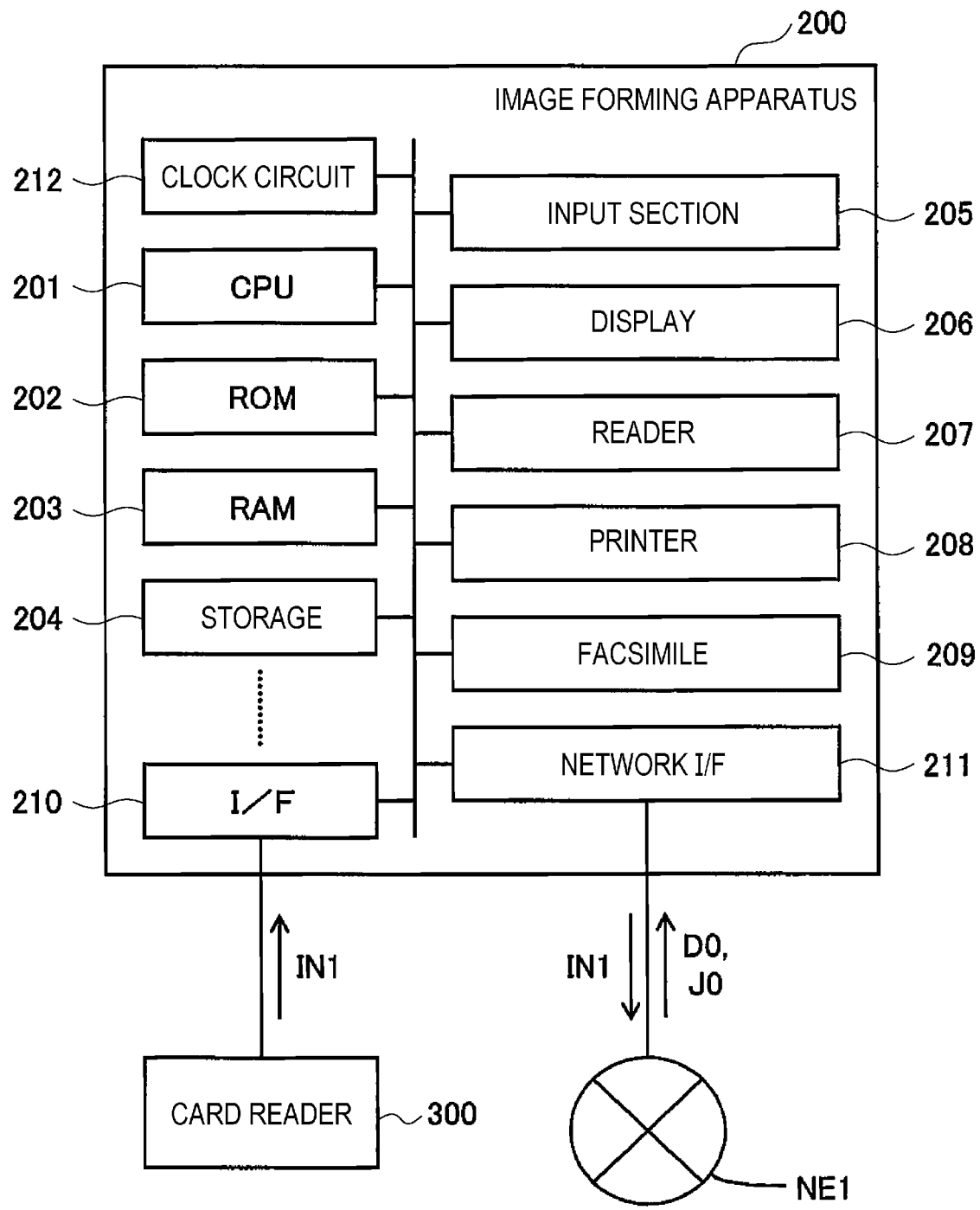
FIG. 3 is a block diagram schematically illustrating an example of a configuration of an image forming apparatus.

The image forming apparatus 200 includes an input section 205, the display 206, the printer 208, and an I/F 210 for the card reader 300. The image forming apparatus 200 may be a multifunction peripheral as illustrated in FIG. 3 or a print dedicated machine. The multifunction peripheral is regarded as a print apparatus having various functions in addition to a print function. Examples of the various functions include a document reading function, a copy function, and a facsimile function.

When acquiring the first authentication information IN1 from the card reader 300, the image forming apparatus 200 transmits the first authentication information IN1 to the authentication printing server 100 through the network NE1. Furthermore, when receiving the screen information DO from the authentication printing server 100 through the network NE1, the image forming apparatus 200 displays a screen on the display 206 in accordance with the screen information DO. Furthermore, when receiving the print job J0 from the authentication printing server 100 through the network NE1, the image forming apparatus 200 executes printing based on the print job J0 using the printer 208.

When the ID card 350 recording the first authentication information IN1 in a computer readable manner is brought into contact with or close to the card reader 300, the card reader 300 reads the first authentication information IN1 from the ID card 350 and transmits the first authentication information IN1 to the image forming apparatus 200. The first authentication information IN1 recorded in the ID card 350 has been associated with the user US0 of an owner of the ID card 350. Accordingly, the card reader 300 accepts an accessing operation performed by the user US0. As the ID card 350, an IC card, a magnetic card, a card on which an identification code including the first authentication information IN1 is printed, or the like may be used. Here, "IC" is an abbreviation of "integrated circuit". Examples of the identification code include a bar code and a two-dimensional code. Examples of the card reader 300 include an IC card reader, a magnetic card reader, and an identification code reader. The card reader 300 may have a function of a writer capable of writing information. Note that the card reader 300 may be directly coupled to the authentication printing server 100 instead of the image forming apparatus 200 or may be connected to the network NE1 when having a function of a web server.

The face authentication server 400 serving as the second authentication section U2 is a server computer including a CPU, a ROM, a RAM, a storage, and an I/F used for connection to the network NE1. Here, "CPU" is an abbreviation of "central processing unit", "ROM" is an abbreviation of "read only memory", and "RAM" is an abbreviation of "random access memory". The storage of the face authentication server 400 stores a face image database DB2 that accumulates feature values of face images of users US0 to whom the authentication is to be granted. The feature values are associated with the users US0.

The face authentication process is performed by determining validity of a person to be authenticated based on a result of a comparison between the feature values of the face images registered in advance and a feature value of a face image of the person to be authenticated at a time of authentication. Various processes are may be employed as the face authentication process. For example, as the face authentication process, the face authentication server 400 performs detection of face portions on a captured face image of a user US0 and the registered face images, detects face feature points based on the detected face portions, and calculates similarity degrees of the face portions based on the detected face feature points. When a calculated similarity degree is larger than a predetermined threshold value, it is determined that the user US0 of the captured face image and a person of a corresponding one of the registered face images is identical.

The face portions may be detected by employing a method for discriminating a face from portions other than the face by means of a support vector machine on the captured face image of the user US0 and the registered individual face images. Furthermore, the face portions may be detected by employing a method for discriminating a face from portions other than the face by means of a deep neural network, a general learning vector quantization method, or the like.

The face feature points may be detected by extracting feature points, such as eyes, a nose, and a mouth, from the face portions, calculating positional relationships between the feature points and predetermined characteristics in the vicinity of the feature points as feature values, and converting the feature values as feature value vectors. Here, examples of the predetermined characteristics include color density and color distribution. The face feature points may be detected by other methods.

The calculation of a similarity degree of a face portion may be realized by a method for calculating a chi-square distance or an Euclidean distance between feature value vectors on the captured face image of the user and the registered individual face images. The similarity degrees of the face points may be calculated by other methods.

A feature value having a similarity degree relative to a feature value of a face image included in a captured image IM1 received from the imaging apparatus 500 through the network NE1 that is larger than a threshold value has been registered in the face image database DB2, the face authentication server 400 generates authentication success information IN3 including information for identifying the user US0. The captured image IM1 of the face of the user US0 is an example of the second authentication information IN2 acquired when the user US0 is detected in a contactless manner. The face authentication is thus performed as the second authentication so as to generate the authentication success information IN3. The authentication success information IN3 indicates that the second authentication has been performed based on the second authentication information IN2 acquired by detecting the user US0 in a contactless manner. When generating the authentication success information IN3, the face authentication server 400 transmits the authentication success information IN3 to the authentication printing server 100 through the network NE1. Note that, when a feature value having a similarity degree relative to a feature value of a face image included in the captured image IM1 that is larger than the threshold value has not been registered in the face image database DB2, the face authentication server 400 may transmit authentication failure information indicating that the second authentication has not been performed to the authentication printing server 100.

The imaging apparatus 500 illustrated in FIG. 1 is a network camera having a function of a web server, and includes a CPU, a ROM, a RAM, a storage, an imaging section, an I/F used for a connection to the network NE1. Therefore, the imaging apparatus 500 may be regarded as a server computer. The imaging apparatus 500 transmits, when capturing a face of the user US0 in a contactless manner, a captured image IM1 to the face authentication server 400 through the network NE1. Note that the imaging apparatus 500 may not be a network camera and may be directly connected to the face authentication server 400.

FIG. 2 is a diagram schematically illustrating a configuration of the authentication printing server 100 that is an example of the information processing apparatus. The authentication printing server 100 includes a CPU 101 that is a processor, a ROM 102 that is a semiconductor memory, a RAM 103 that is a semiconductor memory, a storage device 104, an input device 105, a display device 106, a network I/F 107, and a clock circuit 108. These components are electrically coupled to one another so as to input and output information from and to each other. The network I/F 107 is an example of a transmitter that transmits the screen information DO to the image forming apparatus 200 and is included in the processor U3. Therefore, the processor U3 and the image forming apparatus 200 are connected to each other through the network NE1.

The storage device 104 stores an OS not illustrated, the control program PR1, the authentication database DB1, the screen information DO, the print job J0, and the like. Here, "OS" is an abbreviation of "operating system". The storage device 104 is a computer readable medium recording the control program PR1. The control program PR1 may be recorded in an external computer readable recording medium. The control program PR1 causes the authentication printing server 100 serving as the computer to realize the first authentication function FU1 corresponding to the first authentication section U1 and the processing function FU3 corresponding to the processor U3. The print job J0 is associated with the user US0 before being stored in the storage device 104. In the example of FIG. 2, the storage device 104 stores print jobs J11 to J13 that are associated with a user US1, a print job J21 associated with a user US2, and print jobs J41 and J42 that are associated with a user US4.

As the storage device 104, a magnetic storage device, such as a hard disk, a nonvolatile semiconductor memory, such as a flash memory, or the like may be used.

As the input device 105, a pointing device, hard keys including a keyboard, a touch panel attached to a surface of a display panel, or the like may be used. As the display device 106, a liquid crystal display panel or the like may be used. The network I/F 107 is connected to the network NE1 so as to communicate with a counterpart connected through the network NE1 in accordance with a predetermined communication standard. For example, the network I/F 107 receives the print job registration request RE1, the first authentication information IN1, the authentication success information IN3, or the like from the counterpart, and transmits the screen information DO, the print job J0, or the like to the image forming apparatus 200 serving as the counterpart. The clock circuit 108 is capable of outputting a current date and time.

The CPU 101 executes the control program PR1 read from the storage device 104 to the RAM 103 so as to perform a first authentication process corresponding to the first authentication function FU1 and a control process corresponding to the processing function FU3. The control program PR1 causes the authentication printing server 100 that is the computer to function as the first authentication section U1 and the processor U3. The authentication printing server 100 that executes the control program PR1 performs a first authentication step corresponding to the first authentication function FU1 and a control step corresponding to the processing function FU3.

FIG. 3 is a diagram schematically illustrating a configuration of the image forming apparatus 200. The image forming apparatus 200 includes a CPU 201 that is a processor, a ROM 202 that is a semiconductor memory, a RAM 203 that is a semiconductor memory, a storage 204, an input section 205, a display 206, a reader 207, a printer 208, a facsimile 209, an I/F 210 for the card reader 300, a network I/F 211, and a clock circuit 212. These components are electrically coupled to one another so as to input and output information from and to each other.

The storage 204 stores firmware and the like. The CPU 201 executes the firmware read from the storage 204 into the RAM 203 so as to cause the image forming apparatus 200 to realize a plurality of functions as the image forming apparatus 200. Examples of the functions include a print function, a reading function, a copy function, and a facsimile function. As the storage 204, a nonvolatile semiconductor memory, such as a flash memory, a magnetic storage device, such as a hard disk, or the like may be used.

As the input section 205, a touch panel attached to a surface of a display panel, hard keys, or the like may be used. As the display 206, a liquid crystal display panel or the like may be used. The reader 207 reads a document so as to generate scan data indicating a read image. The printer 208 executes printing on a sheet for printing based on the print job J0. The image forming apparatus 200 reads a document using the reader 207 and performs printing on a read image using the printer 208 so as to perform a copy function. The facsimile 209 transmits an image read by the reader 207 by facsimile transmission to a transmission destination through a telephone line or receives an image by facsimile reception from a transmission source through the telephone line. The image forming apparatus 200 is capable of printing an image supplied from the facsimile 209 using the printer 208. The I/F 210 is connected to the card reader 300 and is capable of receiving the first authentication information IN1 from the card reader 300. The network I/F 211 is connected to the network NE1 so as to communicate with the authentication printing server 100 connected to the network NE1 in accordance with a predetermined communication standard. For example, the network I/F 211 transmits the first authentication information IN1 and the like to the authentication printing server 100 and receives the screen information DO, the print job J0, and the like from the authentication printing server 100. The clock circuit 212 is capable of outputting a current date and time. 3. Concrete Example of Processing of System FIG. 4 is a diagram schematically illustrating an example of a flow of a process performed by the processing system SY1 when card authentication is performed as the first authentication. Here, step S114 corresponds to the first authentication section U1 and the first authentication function FU1. Step S116, step S120, step S122, and step S128 correspond to the processor U3 and the processing function FU3. Hereinafter, a term "step" is omitted and individual step numbers are assigned in parentheses where appropriate.

First, the terminal 600 accepts an operation of registering a print job J0 performed by the user US0 and transmits a registration request of the print job J0, that is, the print job registration request RE1 illustrated in FIG. 1, to the authentication printing server 100 (S102). When receiving the print job registration request RE1 from the terminal 600, the authentication printing server 100 generates a print job J0 based on the print job registration request RE1 and performs a storage process of storing the print job J0 in the storage device 104 after associating the print job J0 with the user US0 (S104). By this, the processor U3 stores the print job J0 associated with the user US0.

Figure 5:
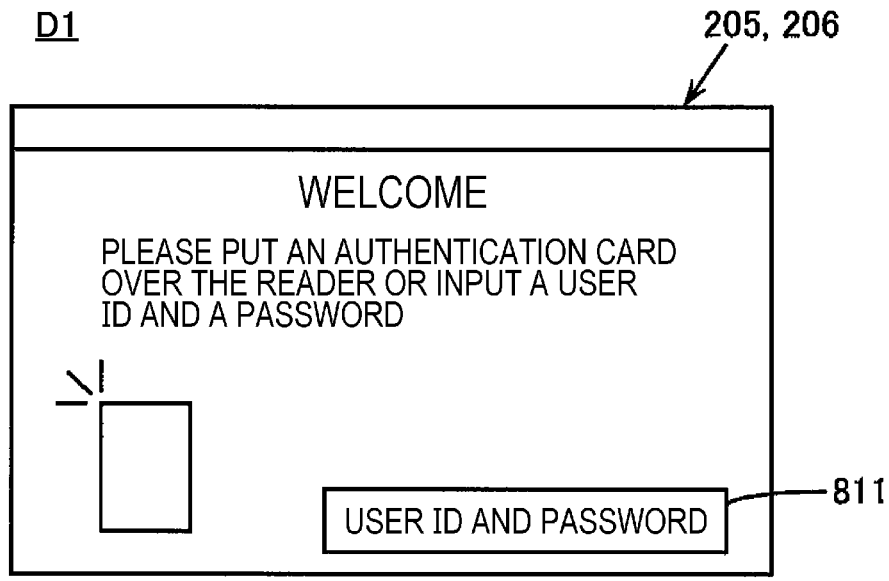
FIG. 5 is a diagram schematically illustrating an example of display of a pre-login screen.

Furthermore, the authentication printing server 100 transmits, before the user US0 logs in, pre-login screen information for displaying the pre-login screen D1 illustrated in FIG. 5 on the display 206 to the image forming apparatus 200 (S106). The image forming apparatus 200 performs, when receiving the pre-login screen information from the authentication printing server 100, a display process of displaying the pre-login screen D1 on the display 206 (S108).

The pre-login screen D1 illustrated in FIG. 5 has content for prompting the user US0 to perform the card authentication or to input a user ID and a password. When the user US0 performs the accessing operation by bringing the ID card 350 into contact with the card reader 300 or putting the ID card 350 over the card reader 300, the card reader 300 reads the first authentication information IN1 including information for identifying the user US0 from the ID card 350 and transmits the first authentication information IN1 to the image forming apparatus 200 (S110). Alternatively, when the user US0 performs a touch operation on a button 811 of "user ID and password" provided on the pre-login screen D1, the image forming apparatus 200 accepts an operation of inputting a user ID and a password performed by the user US0 and transmits the input user ID and the input password as the first authentication information IN1 to the authentication printing server 100. Note that FIG. 4 is a diagram illustrating a process performed when the user US0 performs the accessing operation of bringing the ID card 350 into contact with the card reader 300 or putting the ID card 350 over the card reader 300.

When receiving the first authentication information IN1 from the card reader 300, the image forming apparatus 200 transmits the first authentication information IN1 to the authentication printing server 100 to request login of the user US0 (S112). When receiving the first authentication information IN1 from the image forming apparatus 200, the authentication printing server 100 performs a first authentication process of performing first authentication based on the first authentication information IN1 (S114). The authentication printing server 100 permits login of the user US0 when the first authentication information IN1 has been registered in the authentication database DB1. The first authentication section U1 thus performs the first authentication based on the first authentication information IN1, when receiving the first authentication information IN1 associated with the user US0.

Figure 6:
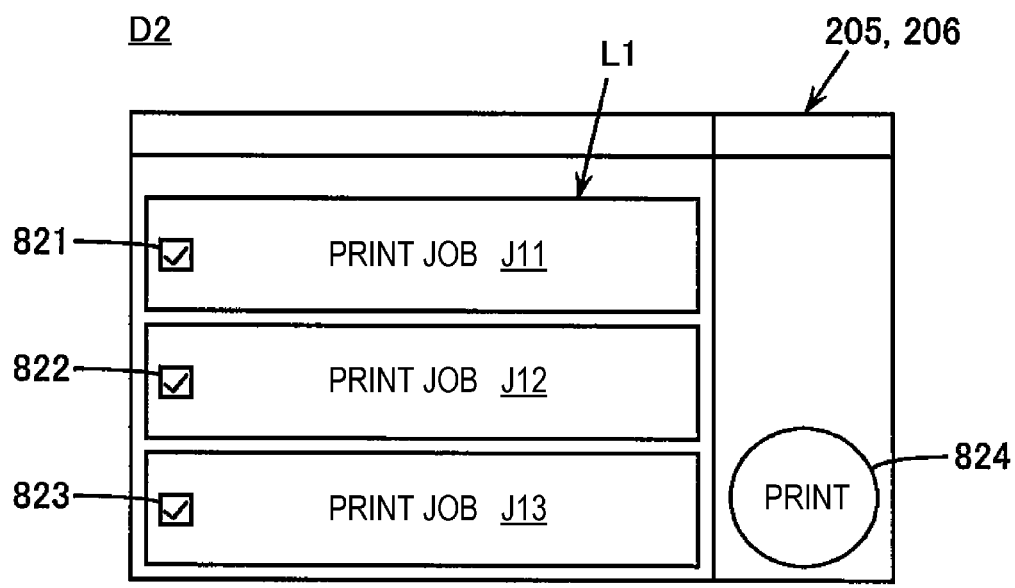
FIG. 6 is a diagram schematically illustrating an example of display of a print instruction screen.

When the first authentication is performed while the print job J0 associated with the user US0 is stored, the authentication printing server 100 transmits print instruction screen information for displaying the print instruction screen D2 illustrated in FIG. 6 on the display 206 to the image forming apparatus 200 (S116). The print instruction screen D2 is used to receive an instruction for executing printing based on the print job J0. The image forming apparatus 200 performs, when receiving the print instruction screen information from the authentication printing server 100, a display process of displaying the print instruction screen D2 on the display 206 (S118).

The print instruction screen D2 illustrated in FIG. 6 includes a list L1 of print jobs J0 and a print button 824. In the example illustrated in FIG. 2, when the first authentication is performed for the user US1, the print jobs J11 to J13 associated with the user US1 are displayed as the list L1 with check boxes 821 to 823. The input section 205 receives an operation of determining whether each of the check boxes 821 to 823 is to be checked. When the input section 205 receives a touch operation on the print button 824 performed by the user US0, the image forming apparatus 200 executes printing based on a print job or print jobs corresponding to at least one of the check boxes 821 to 823 that has been checked. In the example of FIG. 6, the check box 821 corresponding to the print job J11, the check box 822 corresponding to the print job J12, and the check box 823 corresponding to the print job J13 have been checked, and therefore, the image forming apparatus 200 executes printing based on the print jobs J11 to J13.

Note that, when only one print job J0 is associated with the user US0, such as the case of the user US2 as illustrated in FIG. 2, the print instruction screen D2 displays only one print job J0 in a format of the list L1. In this case, the image forming apparatus 200 accepts a determination as to whether printing is to be executed based on the print job J0.

When the print button 824 is touched to be operated, the image forming apparatus 200 transmits selection information indicating a selected print job J0 to the authentication printing server 100 (S120). When receiving the selection information of the print job J0, the authentication printing server 100 transmits print progress screen information for displaying the print progress screen D3 illustrated in FIG. 7 on the display 206 and print data to the image forming apparatus 200 (S122). In S122, the authentication printing server 100 generates print data for executing printing based on the print job J0 indicated by the selection information and transmits the print data to the image forming apparatus 200. The image forming apparatus 200 performs, when receiving the print progress screen information from the authentication printing server 100, a display process of displaying the print progress screen D3 on the display 206 (S124). In S124, the image forming apparatus 200 performs, when receiving the print data from the authentication printing server 100, printing in accordance with the print data. By this, printing is performed based on the print job J0.

Figure 7:
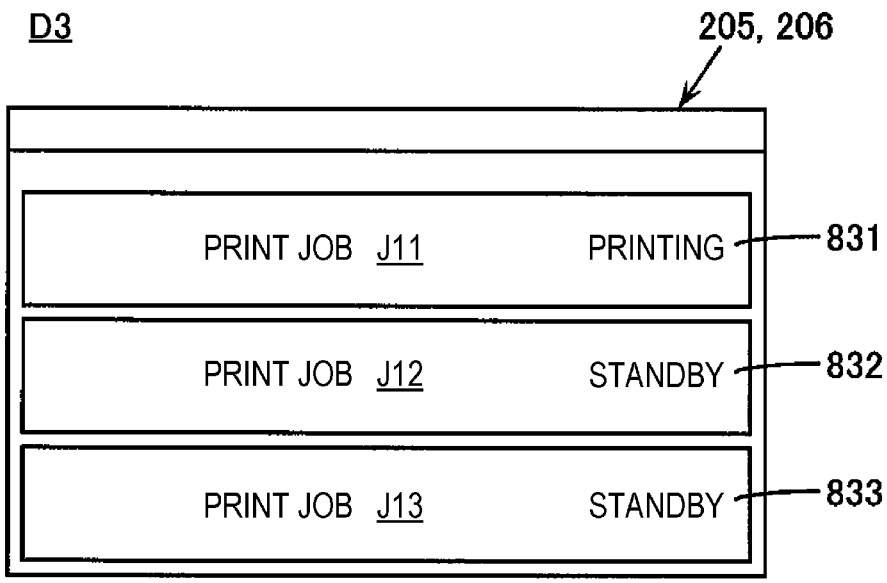
FIG. 7 is a diagram schematically illustrating an example of display of a print progress screen.

On the print progress screen D3 illustrated in FIG. 7, processing states 831 to 833 of the print jobs J0 are displayed. When the check boxes 821 to 823 are checked as illustrated in FIG. 6, the image forming apparatus 200 displays the print state 831 of the print job J11, the print state 832 of the print job J12, and the print state 833 of the print job J13 on the display 206. Note that the print state 831 of "printing" indicates that printing is being executed based on the print job J11 and the print states 832 and 833 of "standby" indicate that printing based on the print jobs J12 and J13 is in a standby state. When the printing based on the print job J11 is completed, the printing based on the print job J12 and the printing based on the print job J13 are executed in turn.

When completing the printing based on the print job J0, the image forming apparatus 200 transmits a print termination notification to the authentication printing server 100 (S126). When receiving the print termination notification from the image forming apparatus 200, the authentication printing server 100 transmits function list screen information for displaying the function list screen D4 illustrated in FIG. 8 on the display 206 to the image forming apparatus 200 (S128). The image forming apparatus 200 performs, when receiving the function list screen information from the authentication printing server 100, a display process of displaying the function list screen D4 on the display 206 (S130).

Figure 8:
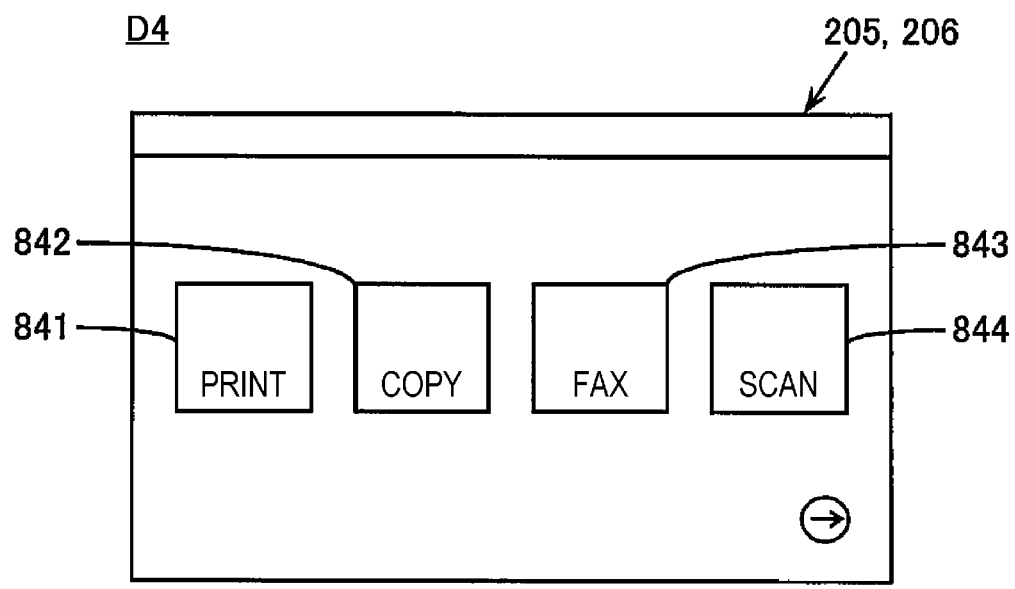
FIG. 8 is a diagram schematically illustrating an example of display of a function list screen.

The function list screen D4 illustrated in FIG. 8 includes a print button 841 for using a print function, a copy button 842 for using a copy function, a fax button 843 for using a facsimile function, and a scan button 844 for using a reading function. The user US0 performs a touch operation on the function list screen D4 while being logged in the authentication printing server 100, so as to use the various functions of the image forming apparatus 200. Note that the user US0 may log out of the authentication printing server 100 by performing a touch operation on a logout button, not illustrated, in the image forming apparatus 200.

In practice, authentication may be successfully performed when the processor U3 performs card authentication or the like while the processor U3 does not store any print job J0 associated with the user US0. In this case, it is highly likely that the user US0 uses a function other than the print function, and therefore, the authentication printing server 100 displays the function list screen D4 on the display 206. A process of this case is illustrated in FIG. 9.

FIG. 9 is a flowchart schematically illustrating a process performed by the first authentication section U1 and the processor U3 when the first authentication is performed. In FIG. 9, steps the same as those illustrated in FIG. 4 are denoted by numbers the same as those in FIG. 4. The process illustrated in FIG. 9 is started when login of the user US0 is requested in S112 of FIG. 4. The authentication printing server 100 executes a plurality of processes in parallel as multitask. Here, S114 corresponds to the first authentication section U1 and the first authentication function FU1. S140, S116, S120, S122, and S128 correspond to the processor U3 and the processing function FU3.

First, the authentication printing server 100 performs the first authentication process of performing first authentication based on the received first authentication information IN1 (S114). Subsequently, the authentication printing server 100 branches the process in accordance with a determination as to whether the print job J0 associated with the user US0 has been stored (S140).

When the print job J0 associated with the user US0 has been stored, the authentication printing server 100 displays the print instruction screen D2 illustrated in FIG. 6 on the display 206 (S116) and receives selection information of the print job J0 (S120). Furthermore, the authentication printing server 100 displays the print progress screen D3 illustrated in FIG. 7 on the display 206 and transmits the print job J0 indicated by the selection information to the image forming apparatus 200 (S122). Thereafter, the authentication printing server 100 displays the function list screen D4 illustrated in FIG. 8 on the display 206 (S128).

When the print job J0 associated with the user US0 is not stored, the process proceeds to S128 where the authentication printing server 100 displays the function list screen D4 illustrated in FIG. 8 on the display 206.

Accordingly, when the first authentication is performed while the processor U3 stores the print job J0 associated with the user US0, the processor U3 displays the print instruction screen D2 including the list L1 of the print jobs J0 on the display 206. Thereafter, the processor U3 accept a selection of at least one of the print jobs J0 in the list L1 and cause the image forming apparatus 200 to perform printing based on the selected print job J0.

On the other hand, when the first authentication is performed while the processor U3 does not store any print job J0 associated with the user US0, the processor U3 displays the function list screen D4 of the image forming apparatus 200 on the display 206.

Here, also when the process from S116 to S130 in FIG. 4 is performed at a time of face authentication instead of the card authentication, the image forming apparatus 200 may perform printing based on the print job J0. However, when the processor U3 accepts a selection of at least one of the print jobs J0 in the list L1, the user US0 is required to perform a touch operation for printing, such as a touch operation on the print instruction screen D2 or the like. In this case, an advantage of the face authentication performed in a contactless manner is reduced.

Therefore, according to the processing system SY1 of this concrete example, printing is performed based on the print job J0 even when a touch operation for a print instruction is not performed at a time of the face authentication.

Figure 10:
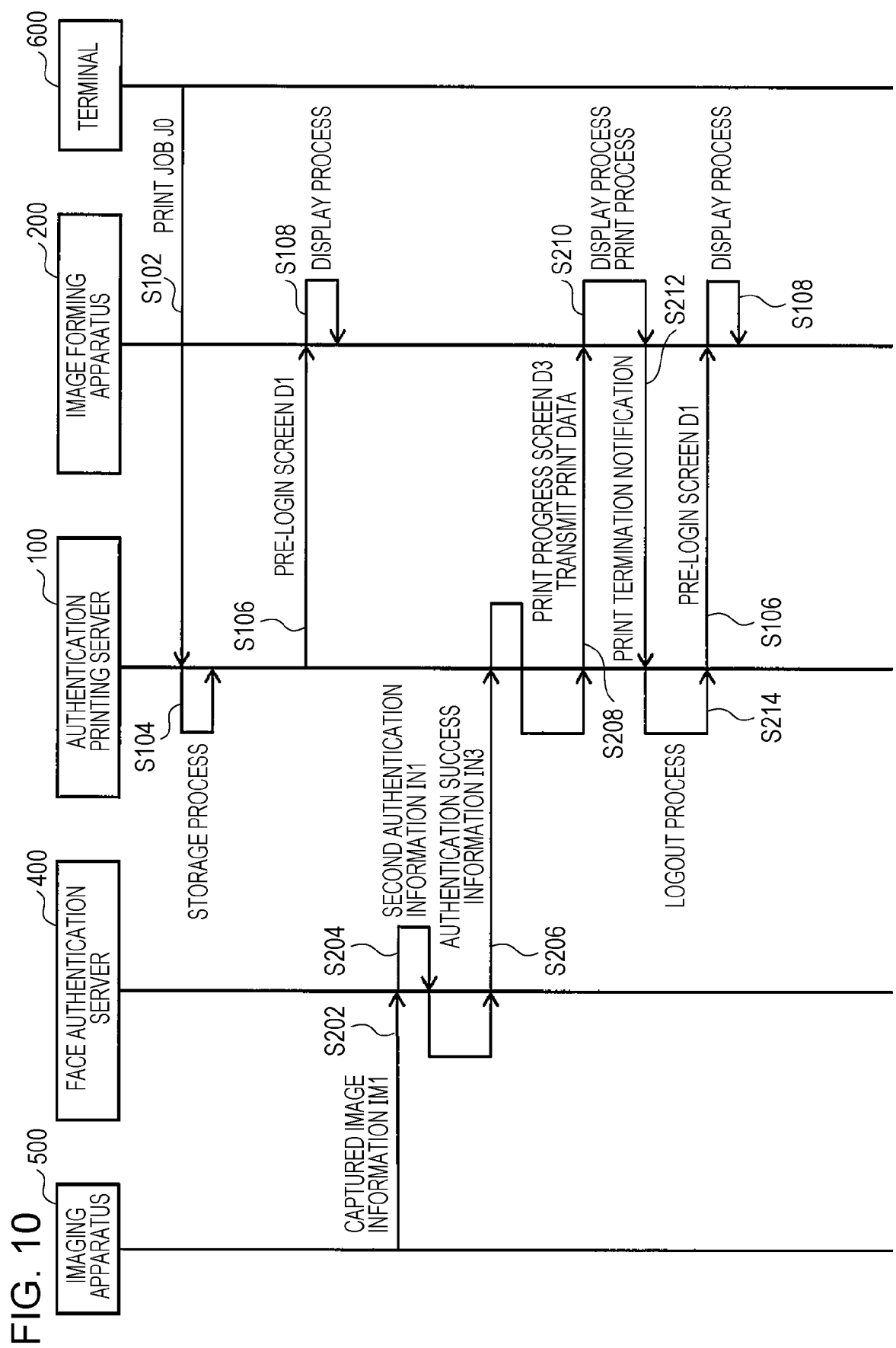
FIG. 10 is a diagram schematically illustrating an example of a flow of a process performed by the system including the processing system when second authentication is performed.
Figure 12:
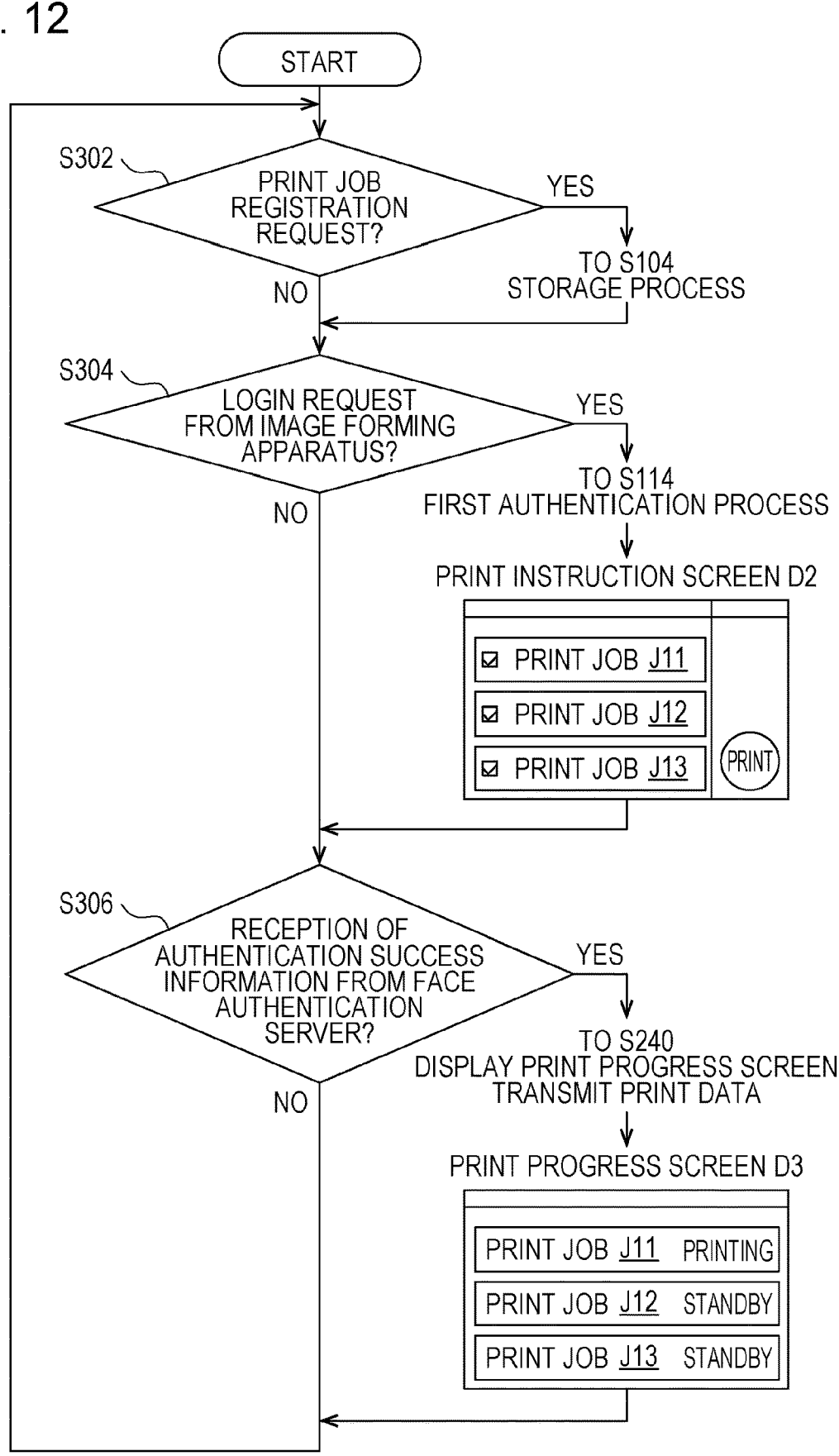
FIG. 12 is a flowchart schematically illustrating an example of a process executed by an information processing apparatus to perform switching between a process performed after the first authentication and a process performed after the second authentication.

FIG. 10 is a diagram schematically illustrating an example of a flow of a process performed by the system including the processing system SY1 when the face authentication is performed as the second authentication. In FIG. 10, steps the same as those illustrated in FIG. 4 are denoted by numbers the same as those in FIG. 4. FIG. 11 is a flowchart schematically illustrating a process performed by the processor U3 when the second authentication is performed. In FIG. 11, steps the same as those illustrated in FIG. 10 are denoted by numbers the same as those in FIG. 10. Here, S240, S242, S208, and S214 correspond to the processor U3 and the processing function FU3. FIG. 12 is a flowchart schematically illustrating a process performed by the authentication print server 100 for switching between a process performed after the card authentication illustrated in FIGS. 4 and 9 and a process performed after the face authentication illustrated in FIGS. 10 and 11.

First, the process in FIG. 12 will be described.

The authentication printing server 100 stores, when receiving the print job registration request RE1 from the terminal 600 (S302), the print job J0 as described in S104 of FIGS. 4 and 10 and continues the process in FIG. 12.

Furthermore, the authentication printing server 100 proceeds to S114 in FIGS. 4 and 9, when receiving a login request along with the first authentication information IN1 from the image forming apparatus 200 (S304), to perform the first authentication process. The authentication printing server 100 displays the print instruction screen D2 on the display 206 while storing the print job J0 associated with the user US0 and continues the process illustrated in FIG. 12 through S120 to S128 illustrated in FIG. 4.

Furthermore, when the authentication printing server 100 receives authentication success information IN3 from the face authentication server 400 (S306), the process proceeds to S240 of FIG. 11. The authentication printing server 100 displays the print progress screen D3 on the display 206 while storing the print job J0 associated with the user US0 and transmits print data to the image forming apparatus 200. The authentication printing server 100 continues the process in FIG. 12 through S212 and S214 of FIG. 10.

Accordingly, when the card authentication is performed while the print job J0 associated with the user US0 is stored, the user US0 may instruct execution of printing based on the print job J0 on the print instruction screen D2. When the face authentication is performed while the print job J0 associated with the user US0 is stored, the image forming apparatus 200 executes printing based on the print job J0 without displaying the print instruction screen D2. In this case, the user US0 is not required to touch any device when requesting user authentication, or not required to touch the image forming apparatus 200 when using the image forming apparatus 200 to perform printing based on the print job J0. According to the processing system SY1 of this concrete example, the process from the authentication to the printing may be performed in a contactless manner where appropriate.

Next, referring to FIG. 10, an example of a flow of a process performed by the system including the processing system SY1 when the face authentication is performed will be illustrated. Note that the process from S102 to S108 is the same as the process from S102 to S108 of FIG. 4, and therefore, a description thereof is omitted.

The imaging apparatus 500 transmits, when capturing a face of the user US0 in a contactless manner, a captured image IM1 to the face authentication server 400 (S202). When receiving the captured image IM1 from the imaging apparatus 500, the face authentication server 400 performs a second authentication process of performing second authentication based on the captured image IM1 serving as the second authentication information IN2 (S204). A feature value having a similarity degree relative to a feature value of a face image included in the captured image IM1 that is larger than a threshold value has been registered in the face image database DB2, the face authentication server 400 generates authentication success information IN3 including information for identifying the user US0 and transmits the authentication success information IN3 to the authentication printing server 100 (S206).

When receiving the authentication success information IN3 including information for specifying the user US0 described above while the print job J0 associated with the user US0 is stored, the authentication printing server 100 transmits print progress screen information for displaying the print progress screen D3 illustrated in FIG. 7 on the display 206 and print data to the image forming apparatus 200 (S208). In S208, the authentication printing server 100 generates print data for executing printing based on all print jobs J0 associated with the user US0 and transmits the print data to the image forming apparatus 200. In the example of FIG. 2, when receiving the authentication success information IN3 corresponding to the user US1, the authentication printing server 100 generates print data for executing printing based on the print jobs J11 to J13 associated with the user US1. The image forming apparatus 200 performs, when receiving the print progress screen information from the authentication printing server 100, a display process of displaying the print progress screen D3 on the display 206 (S210). In S210, the image forming apparatus 200 performs, when receiving print data from the authentication printing server 100, printing in accordance with the print data. By this, the printing is performed based on the print jobs J0.

When completing the printing based on the print jobs J0, the image forming apparatus 200 transmits a print termination notification to the authentication printing server 100 (S212). When receiving the print termination notification from the image forming apparatus 200, the authentication printing server 100 performs a logout process to terminate the login state of the user US0 (S214). Thereafter, the authentication printing server 100 transmits the pre-login screen information to the image forming apparatus 200 in S106. The image forming apparatus 200 performs, when receiving the pre-login screen information from the authentication printing server 100, a display process of displaying the pre-login screen D1 on the display 206 (S108).

In practice, authentication may be successfully performed when the processor U3 performs the face authentication while the processor U3 does not store any print job J0 associated with the user US0. In this case, it is highly likely that the user US0 uses a function other than the print function, and therefore, the authentication printing server 100 displays the function list screen D4 on the display 206. A process of this case is illustrated in FIG. 11. The process in FIG. 11 is started when the authentication printing server 100 receives the authentication success information IN3 from the face authentication server 400 in S206 of FIG. 10.

First, the authentication printing server 100 branches the process in accordance with a determination as to whether the print job J0 associated with the user US0 has been stored (S240).

When storing the print job J0 associated with the user US0, the authentication printing server 100 displays the print progress screen D3 of FIG. 7 on the display 206 and transmits print data for executing printing based on all print jobs J0 associated with the user US0 to the image forming apparatus 200 (S208). Thereafter, the authentication printing server 100 performs the logout process (S214).

When the print job J0 associated with the user US0 has not been stored, the authentication printing server 100 displays the function list screen D4 illustrated in FIG. 8 on the display 206 (S242).

Accordingly, when acquiring the authentication success information IN3 from the face authentication server 400 serving as the second authentication section U2 while storing the print job J0 associated with the user US0, the processor U3 causes the image forming apparatus 200 to execute printing based on the print job J0 without displaying the print instruction screen D2 on the display 206.

On the other hand, when acquiring the authentication success information IN3 while the processor U3 does not store any print job J0 associated with the user US0, the processor U3 displays the function list screen D4 of the image forming apparatus 200 on the display 206.

Accordingly, when the first authentication, such as the card authentication, is performed while the first processor U3 stores the print job J0 associated with the user US0, the print instruction screen D2 for accepting an instruction for executing printing based on the print job J0 is displayed on the display 206. In this case, the user US0 may instruct execution of printing based on the print job J0 on the print instruction screen D2. When the face authentication as the second authentication that does not require a touch operation is performed while the first processor U3 stores the print job J0 associated with the user US0, printing based on the print job J0 is executed without displaying the print instruction screen D2 on the display 206. In this case, the user US0 is not required to touch any device when user authentication is requested, or not required to touch the image forming apparatus 200 when using the image forming apparatus 200 to perform printing based on the print job J0. According to the processing system SY1 of this concrete example, the process from the authentication to the printing may be performed in a contactless manner where appropriate.

4. Modifications

Various modifications of the present disclosure may be made.

For example, the authentication printing server 100 may include the second authentication section U2 in addition to the first authentication section U1. Furthermore, the processing system SY1 may include a third authentication section or the like that performs third authentication that is different from the first authentication or the second authentication.

The first authentication is not limited to the card authentication and the authentication performed by an operation of inputting a user ID and a password, and may be fingerprint authentication or the like. The second authentication is not limited to the face authentication and may be iris verification or the like.

The processes described above may be modified where appropriate by changing order or the like. Note that the processes described above are not limited to examples of those executed by the CPU but may be executed by an electronic component, such as an ASIC. Here, "ASIC" is an abbreviation of "application specific integrated circuit". Furthermore, the processes described above may be performed in a distributed manner by a plurality of CPUs or executes by the CPU and the electronic component, such as the ASIC, in cooperation.

As illustrated in FIG. 13, the processing system SY1 may not include the authentication printing server 100, and the image forming apparatus 200 may include the first authentication section U1 and the processor U3. FIG. 13 is a diagram schematically illustrating another configuration of a system including the processing system SY1 in detail. The system includes the image forming apparatus 200, the card reader 300, the face authentication server 400, the imaging apparatus 500, and the terminal 600. The processing system SY1 includes the image forming apparatus 200, and the card reader 300. The image forming apparatus 200 includes the display 206, the printer 208, the first authentication section U1, and the processor U3. The first authentication section U1 permits login of the user US0 in response to a reception of the first authentication information IN1 from the card reader 300 when the first authentication information IN1 has been registered in the authentication database DB1. The first authentication is thus performed. When receiving a print job registration request RE1 from the terminal 600 through the network NE1, the processor U3 generates a print job J0 in accordance with the print job registration request RE and associates the print job J0 with the user US0 to be stored. When generating authentication success information IN3, the face authentication server 400 transmits the authentication success information IN3 to the image forming apparatus 200 through the network NE1.

When the first authentication, such as the card authentication, is performed while the processor U3 stores the print job J0 associated with the user US0, the processor U3 displays the print instruction screen D2 illustrated in FIG. 6 on the display 206. Furthermore, when receiving the authentication success information IN3 from the face authentication server 400 while storing the print job J0 associated with the user US0, the processor U3 causes the printer 208 to execute printing based on the print job J0 without displaying the print instruction screen D2 on the display 206.

Also according to the processing system SY1 illustrated in FIG. 13, the process from the authentication to the printing may be performed in a contactless manner where appropriate. Obviously, the image forming apparatus 200 may include the second authentication section U2 or include the third authentication section or the like.

As illustrated in FIG. 14, it is convenient when switching from the second authentication, such as the face authentication, to the first authentication, such as the card authentication, is available. FIG. 14 is a flowchart schematically illustrating another process performed by the processor U3 when the second authentication is performed. In FIG. 14, steps the same as those illustrated in FIG. 11 are denoted by numbers the same as those in FIG. 11. The process in FIG. 14 is started when the authentication printing server 100 receives the authentication success information IN3 from the face authentication server 400 in S206 of FIG. 10. Here, S240, S242, S244, S246, S208, and S214 correspond to the processor U3 and the processing function FU3.

First, the authentication printing server 100 branches the process in accordance with a determination as to whether the print job J0 associated with the user US0 has been stored (S240).

The authentication printing server 100 branches the process in accordance with a determination as to whether the first authentication has been performed for the user US0 (S244) when storing the print job J0 associated with the user US0. The authentication printing server 100 executes a plurality of processes in parallel as multitask. For example, it is determined that the first authentication has been performed when the authentication printing server 100 performs the card authentication of the user US0 in a process other than the process of FIG. 14. When the first authentication is performed, the process proceeds to S116 of FIG. 4 where the authentication printing server 100 displays the print instruction screen D2 of FIG. 6 on the display 206.

When the first authentication has not been performed, the authentication printing server 100 branches the process in accordance with a determination as to whether a predetermined period of time has elapsed after the authentication success information IN3 is received (S246). The predetermined period of time described above is not particularly limited and may be approximately in a range from 10 seconds to 30 seconds that is set in accordance with a use state. When the predetermined period of time has not elapsed, the authentication printing server 100 performs the process from S244 to S246 again. Accordingly, when the first authentication is performed for the user US0 within the predetermined period of time after the authentication success information IN 3 corresponding to the user US0 is acquired, the authentication printing server 100 does not cause the image forming apparatus 200 to execute printing but displays the print instruction screen D2 on the display 206.

When the predetermined period of time has elapsed, the authentication printing server 100 displays the print progress screen D3 of FIG. 7 on the display 206 and transmits print data for executing printing based on all print jobs J0 associated with the user US0 to the image forming apparatus 200 (S208). Thereafter, the authentication printing server 100 performs a logout process (S214).

Note that, when the print job J0 associated with the user US0 has not been stored, the authentication printing server 100 displays the function list screen D4 illustrated in FIG. 8 on the display 206 (S242).

According to the example illustrated in FIG. 14, an instruction for executing printing may be issued by operating the print instruction screen D2 within the predetermined period of time after the second authentication, such as the face authentication, is performed, and therefore, usability may be improved.

5. Conclusion

As described above, the various modes of the present disclosure may provide a technique or the like capable of performing the process from the authentication to the printing in a contactless manner where appropriate. Even techniques only including components associated with independent claims offer the basic operations and the basic effects described above.

Furthermore, a configuration obtained by replacing the components disclosed in the foregoing examples or modifying a combination of the components, a configuration obtained by replacing the components disclosed in general techniques and the foregoing examples or modifying a combination of the components, and the like may also be embodied. The present disclosure also includes these configurations.

What is claimed is:

1. A processing system including an image forming apparatus that has a display, the processing system comprising:
a processor configured to:
acquire first authentication information associated with a user;
perform first authentication based on the acquired first authentication information;
acquire authentication success information indicating success of second authentication, wherein
the second authentication is based on second authentication information that is different from the first authentication information, and
the second authentication information is acquired by detecting the user in a contactless manner;
store a print job associated with the user;
control, in a case where the first authentication is performed while the print job associated with the user is stored, display of a print instruction screen on the display for accepting an instruction for executing printing, wherein the execution of the printing is based on the print job; and
cause, in a case where the authentication success information associated with the second authentication is acquired while the print job associated with the user is stored, the image forming apparatus to execute the printing based on the print job without displaying the print instruction screen on the display.

2. The processing system according to claim 1, wherein the processor is further configured to acquire the first authentication information from a receiver that receives an accessing operation of the user.

3. The processing system according to claim 2, wherein the processor is further configured to acquire the first authentication information from a card recorded such that the first authentication information is readable from the card,
the second authentication information is a captured image of a face of the user,
the authentication success information is generated in a case where a face authentication server performs face authentication based on the captured image as the second authentication, and
the processor is configured to acquire the authentication success information from the face authentication server.

4. The processing system according to claim 1, wherein, when the first authentication is performed while the print job associated with the user is stored, the processor is further configured to:
control display of the print instruction screen including a list of print jobs on the display;
accept a selection of one of the print jobs in the list; and
cause the image forming apparatus to execute the printing based on the selected one of the print jobs.

5. The processing system according to claim 1, wherein, in a case where the first authentication is performed or the authentication success information is acquired while the processor does not store the print job associated with the user, the processor is further configured to control display of a function list screen of the image forming apparatus on the display.

6. The processing system according to claim 1, wherein, in a case where the first authentication is performed for the user within a predetermined period of time after the authentication success information for the user is acquired, the processor is further configured to control display of the print instruction screen on the display without causing the image forming apparatus to execute the printing.

7. The processing system according to claim 1, wherein the processor is included in the image forming apparatus.

8. The processing system according to claim 1, wherein the processor is connected to the image forming apparatus through a network, and
the processor includes a transmitter that transmits screen information to be displayed on the display to the image forming apparatus through the network.

9. The processing system according to claim 1, wherein the processor is further configured to switch between a first process of the display of the print instruction screen and a second process of the execution of the printing without displaying the print instruction screen, and
the switch is based on whether the first authentication is performed or the authentication success information associated with the second authentication is acquired.

10. An information processing apparatus connected to an image forming apparatus that includes a display, the information processing apparatus comprising:
a processor configured to:
acquire first authentication information associated with a user;
perform first authentication based on the acquired first authentication information;
acquire authentication success information indicating success of second authentication, wherein
the second authentication is based on second authentication information that is different from the first authentication information, and
the second authentication information is acquired by detecting the user in a contactless manner;
store a print job associated with the user;
transmit, in a case where the first authentication is performed while the print job associated with the user is stored, information for displaying a print instruction screen on the display for accepting an instruction for executing printing, wherein the execution of the printing is based on the print job; and
cause, in a case where the authentication success information associated with the second authentication is acquired while the print job associated with the user is stored, the image forming apparatus to execute the printing based on the print job without displaying the print instruction screen on the display.

11. A non-transitory computer-readable storage medium storing computer-executable instructions that controls an image forming apparatus that includes a display, the computer-executable instructions cause a computer to execute operations, the operations comprising:
performing first authentication based on first authentication information associated with a user in a case where the first authentication information is acquired;
acquiring authentication success information indicating success of second authentication, wherein the second authentication is based on second authentication information that is different from the first authentication information, and the second authentication information is acquired by detecting the user in a contactless manner;

storing a print job associated with the user;

controlling, in a case where the first authentication is performed while the print job associated with the user is stored, display of a print instruction screen on the display for accepting an instruction for executing printing, wherein the execution of the printing is based on the print job; and causing, in a case where the authentication success information associated with the second authentication is acquired while the print job associated with the user is stored, the image forming apparatus to execute the printing based on the print job without displaying the print instruction screen on the display.

12. An image forming apparatus, comprising:

a display;

a printer; and a processor configured to:

acquire first authentication information associated with a user;

perform first authentication based on the acquired first authentication information;

acquire authentication success information indicating success of second authentication, wherein the second authentication is based on second authentication information that is different from the first authentication information, and the second authentication information is acquired by detecting the user in a contactless manner;

store a print job associated with the user;

control, in a case where the first authentication is performed while the print job associated with the user is stored, display of a print instruction screen on the display for accepting an instruction for executing printing, wherein the execution of the printing is based on the print job; and cause, in a case where the authentication success information associated with the second authentication is acquired while the print job associated with the user is stored, the printer to execute the printing based on the print job without displaying the print instruction screen on the display.

* * * * *